United States Patent [19]

Shimada et al.

[11] 4,257,274
[45] Mar. 24, 1981

[54] CAPACITIVE PRESSURE SENSOR

[75] Inventors: Satoshi Shimada; Kanji Kawakami; Motohisa Nishihara, all of Ibaraki, Japan

[73] Assignee: Hitachi, Ltd., Tokyo, Japan

[21] Appl. No.: 59,552

[22] Filed: Jul. 23, 1979

[30] Foreign Application Priority Data

Jul. 21, 1978 [JP] Japan .................................. 53/88450

[51] Int. Cl.³ ............................................. G01L 9/12
[52] U.S. Cl. ......................................... 73/718; 361/283
[58] Field of Search ............... 73/718, 724, 721, 727, 73/777; 361/283

[56] References Cited

U.S. PATENT DOCUMENTS

| | | | |
|---|---|---|---|
| 3,232,114 | 2/1966 | Ferran | 73/718 |
| 3,397,278 | 8/1968 | Pomerantz | 174/52 |
| 3,405,559 | 10/1968 | Moffatt | 73/718 |
| 3,697,918 | 10/1972 | Orth et al. | 73/777 |
| 3,748,571 | 7/1973 | Kurtz | 361/283 |
| 3,793,885 | 2/1974 | Frick | 73/718 |
| 3,800,264 | 3/1974 | Kurtz | 73/727 |

*Primary Examiner*—Donald O. Woodiel
*Attorney, Agent, or Firm*—Craig & Antonelli

[57] ABSTRACT

A capacitive pressure sensor is provided which has a conductive silicon diaphragm having a thick supporting portion at the periphery thereof and a thin inner deflecting portion which is reduced in thickness from the supporting portion by means of an etching process which makes possible a very accurate dimensioning of the hollow formed by the deflecting portion of the diaphragm. A substrate of borosilicate glass has a flat surface which is placed against the side of the diaphragm in contact with the supporting portion and the two elements are joined by a process of anodic bonding so that a pressure chamber is formed between the substrate and the thin deflecting portion of the diaphragm. Within the pressure chamber, a thin electrode is provided on the surface of the substrate thereby forming electrostatic capacity between the substrate and the diaphragm and a hole is provided through the substrate for supplying of fluid into the pressure chamber.

11 Claims, 9 Drawing Figures

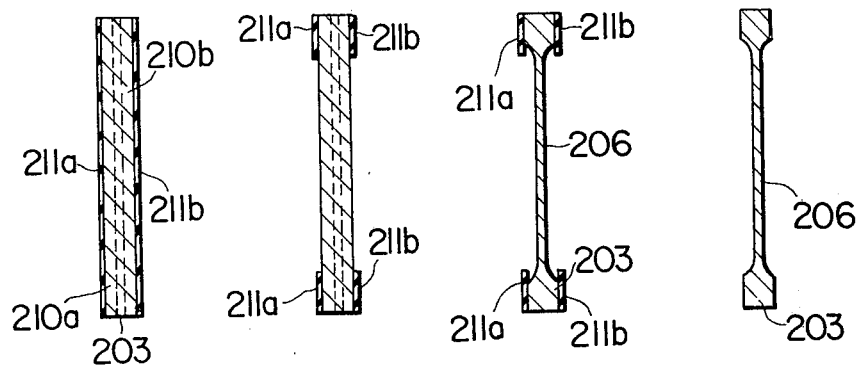
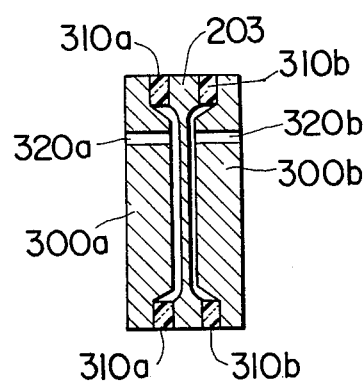
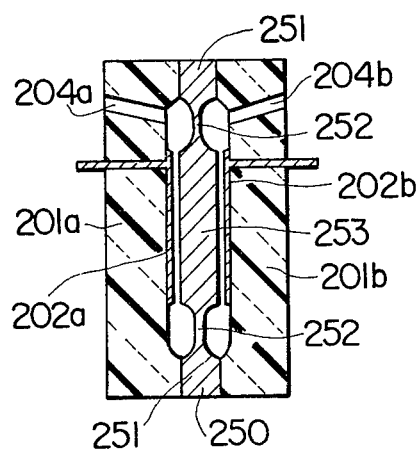
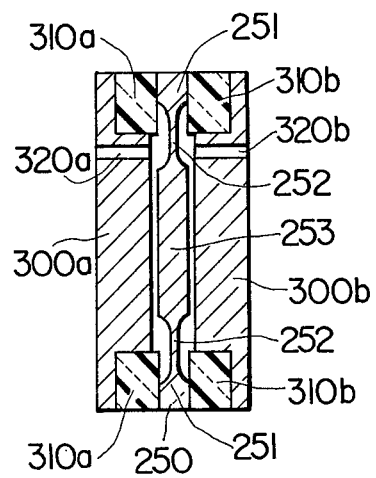

CAPACITIVE PRESSURE SENSOR

BACKGROUND OF THE INVENTION

This invention relates to a pressure sensor, and more particularly to a capacitive pressure sensor which detects the deviation of a diaphragm responsive to a pressure in the form of a change in an electrostatic capacity.

As disclosed in, for example, U.S. Pat. No. 3,232,114, a capacitive pressure sensor has heretofore been provided in which a resilient diaphragm is formed of metal under uniform tension. It is required of the capacitive pressure sensor that the proportionality (linearity) between the input pressure and the output voltage is high. For meeting this requirement, it is a very important factor that the diaphragm is formed under uniform tension. In the disclosure of the above patent, the diaphragm is maintained under a stress of approximately 60,000 pounds, and its marginal portion is disposed between and is welded to two metal housing sections. The diaphragm, for the above reasons, must be carefully welded to the two housing sections while in stressed condition. Such a process has been carried out with, for example, arc welding or electron-beam welding. However, it has been very difficult to fix the diaphragm under the high tension and uniform state, resulting in the disadvantage of low productivity.

In U.S. Pat. No. 3,793,885, there is disclosed a diaphragm construction for a capacitive pressure transducer in which the measuring components, particularly a pressure-deformable diaphragm, are constructed from a brittle material, such as fused quartz, to take advantage of low hysteresis and creep factors and a low thermal coefficient of expansion. However, the brittle materials disclosed in this patent are insulators, and a conductor must be evaporated onto the surface of the pressure-deformable diaphragm formed of the insulator. In addition, the shape of the diaphragm is cylindrical.

Various techniques for joining elements are also known in the art; for example, U.S. Pat. No. 3,397,278 discloses an anodic bonding technique.

SUMMARY OF THE INVENTION

It is therefore an object of this invention to provide a capacitive pressure sensor which does not require a difficult welding process as in the prior art, that is, which has a structure which is easy to fabricate.

Another object of this invention is to provide a capacitive pressure sensor which has a novel diaphragm having excellent characteristics.

Still another object of this invention is to provide a capacitive pressure sensor which is excellent in various characteristics and small in size.

This is accomplished by employing the anodic bonding technique in the step of bonding a diaphragm formed of a conductor onto a substrate formed of an insulator.

Excellent characteristics are also accomplished by forming the diaphragm of the capacitive pressure sensor by the use of silicon.

Finally, in accordance with the invention, the diaphragm is formed of silicon which is excellent in workability, while the substrate is formed of borosilicate glass which is substantially equal to silicon in the coefficient of thermal expansion, and that the silicon diaphragm and the substrate made of borosilicate glass are joined by the anodic bonding technique. The diaphgram itself is formed of an outer thick supporting portion and an inner thin deflecting portion so that in combination with the substrate a hollow pressure chamber is provided.

The above objects and other objects and advantages of the present invention will become apparent from the following detailed description of the preferred embodiments given with reference to the accompanying drawings.

BRIEF DESCRIPTION OF DRAWINGS

FIGS. 3(a) to 3(d) are views for explaining a manufacturing process for a silicon diaphragm shown in FIG. 1 or FIG. 2;

FIG. 4 is a sectional view showing another embodiment of the capacitive pressure sensor according to this invention;

FIGS. 5 and 6 are sectional views each showing another embodiment of the capacitive pressure sensor according to this invention which has a diaphragm of different shape;

DETAILED DESCRIPTION OF PREFERRED EMBODIMENTS

Figure 1:
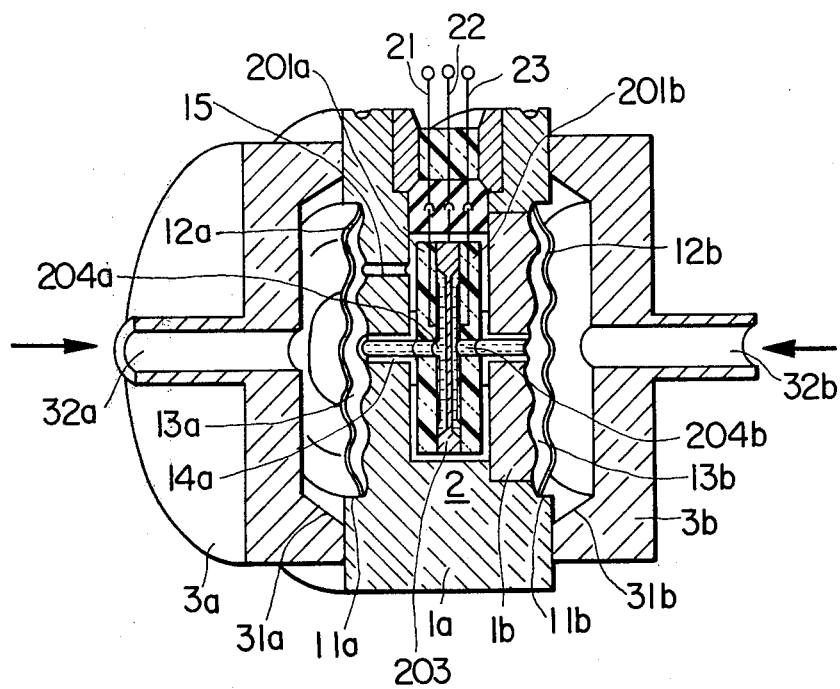
FIG. 1 is a perspective view, partially in section, of a differential pressure transmitter for industrial use which employs an embodiment of the capacitive pressure sensor according to this invention.

Referring to FIG. 1, a differential pressure transmitter for industrial use has housings 1a and 1b in which a capacitive pressure sensor, more exactly, differential pressure sensor 2 according to this invention is assembled, and two end caps 3a and 3b which are placed on respective sides of the housings. Both the housings 1a and 1b and the two end caps 3a and 3b are formed by, for example, the die casting of a metal such as aluminum, and they are rigidly secured to each other by, for example, welding or screws.

The respective sides of the housings 1a and 1b are formed with circular recesses 11a and 11b, which define spaces along with recesses 31a and 31b of the end caps 3a and 3b, respectively. The respective end caps 3a and 3b have pressure inlets 32a and 32b, through which external fluids under respective pressures to be measured are led into the spaces inside the pressure transmitter.

Seal diaphragms 12a and 12b which are made of a rigid and corrosion-proof material, such as stainless steel, are firmly secured by welding or the like on the bottom surfaces of the two recesses 11a and 11b formed on the sides of the housings 1a and 1b, respectively. In interspaces which are respectively formed between the seal diaphragms 12a and 12b and the bottom surfaces of the recesses 11a and 11b of the housings 1a and 1b, sealing liquids 13a and 13b, such as silicone oil, are enclosed in a manner to fill up the interspaces. Pressure conduits 14a and 14b are provided in the bottoms of the recesses 11a and 11b of both the housings 1a and 1b, and the silicone oils 13a and 13b in the interspaces are introduced into the capacitive differential pressure sensor 2 through the pressure conduits. The bottom of the recess 11a formed on the side of one housing 1a is further formed with a penetrating hole 15, through which the silicon oil 13a in the interspace is led around the capacitive differential pressure sensor 2. Three lead wires 21, 22 and 23 from the capacitive differential pressure sensor 2 are led out of the differential pressure transmitter through a layer 16 of an insulator disposed between the housings 1a and 1b and a layer 17 of a glass molded on the insulator layer.

Figure 2:
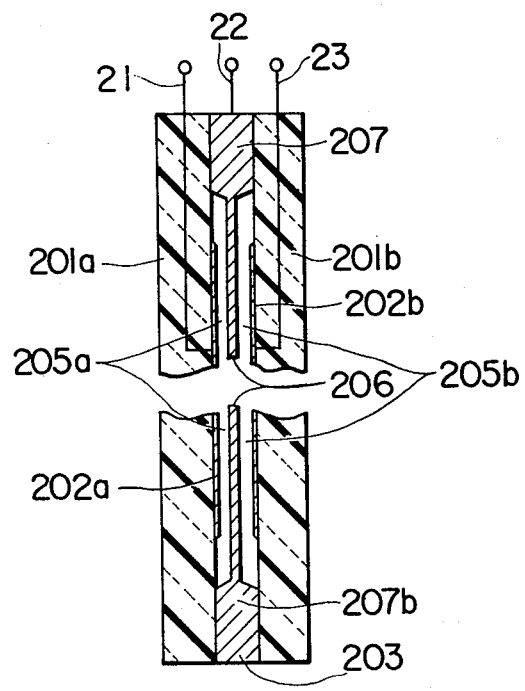
FIG. 2 is an enlarged sectional view of the capacitive pressure sensor shown in FIG. 1.

Referring also to FIG. 2, the capacitive differential pressure sensor 2 has substrates 201a and 201b which are formed of an insulating material and which have metallic thin film electrodes 202a and 202b attached to their inner surfaces, respectively, and a diaphragm 203 which is sandwiched between the two substrates 201a and 201b. The substrates 201a and 201b are respectively formed with pressure introducing apertures 204a and 204b at positions corresponding to the pressure conduits 14a and 14b, and through the pressure conduits 14a and 14b as well as the pressure introducing apertures 204a and 204b, the silicone oils 13a and 13b enclosed in the interspaces are led into pressure chambers 205a and 205b defined between the substrates 201a and 201b and the diaphragm 203, respectively. The diaphragm 203 is made up of a thin-walled movable portion 206 and a thick-walled fixed portion 207. The electrodes 202a and 202b are respectively led to the lead wires 21 and 23 through lead wires 208a and 208b which are buried in the substrates 201a and 201b. A three-layered electrode or an aluminum electrode, for example, is formed on the diaphragm 203, and the lead wire 22 is connected therewith.

In this embodiment, both the substrates 201a and 201b are formed of borosilicate glass, while the diaphragm 203 is formed of silicon. Such silicon diaphragm 203 has the advantage that the various characteristics thereof as a diaphragm are excellent owing to low hysteresis and creep factors. Besides, it has the advantage that a precise and distortionless working can be made by, for example, etching, especially a superprecision working in the order of microns being possible with the alkali etching technique. Since the silicon can also be used as a conductor by adjusting the impurity density thereof, it becomes unnecessary to form a thin film electrode of a metal or the like on the surface of the silicon. The borosilicate glass forming the substrate has a coefficient of thermal expansion of $3.25 \times 10^{-6}/°C.$, which is approximately equal to the coefficient of thermal expansion of the silicon, so that any distortion is not caused by a change in the ambient temperature.

An example of a method of fabricating the capacitive differential pressure sensor will now be described. A metal of high conductivity such as gold (Au) and platinum (Pt) is evaporated or plated onto the inner surfaces of the substrates 201a and 201b, to form the thin film electrodes 202a and 202b. Thereafter, the silicon diaphragm 203 is sandwiched in between these substrates 201a and 201b. A positive electrode is attached to the conductor, i.e., silicon diaphragm 203, while a negative electrode is attached to the insulator, i.e., glass substrates 201a and 201b. Subsequently, the whole structure is heated to a temperature of about 450° C., and a high voltage of about 1,000 volts (V) is applied across the electrodes for several minutes. In consequence, the bonded surfaces between the silicon diaphragm 203 and the glass substrates 201a and 201b are electrostatically joined, and they never separate even when the voltage is removed. Owing to such anodic bonding technique, the diaphragm and the substrates can be joined under the ideal state of high strength and no distortion without employing any binder. For this reason, the linearity in the pressure transduction characteristic of the capacitive pressure sensor having the above construction is enhanced. According to such process, a plurality of capacitive pressure sensors can be assembled at a time by placing the glass substrates on a silicon wafer in which a plurality of diaphragms are formed. Therefore, the productivity is also enhanced.

FIGS. 3(a) to 3(d) illustrates a method of fabricating the silicon diaphragm 203 shown in FIG. 1 or FIG. 2. First of all, as shown in FIG. 3(a), layers 210a and 210b in which, for example, boron is diffused at a high density of $10^{24}$ atoms/cm$^3$ are formed in both the surfaces of the silicon substrate 203. As shown in FIG. 3(b), oxide films 211a and 211b formed at this time are partly removed with the photoetching. Subsequently, as shown in FIG. 3(c), the heavily doped layers are removed by acid etching, alkali etching or the like by employing the remaining oxide films 211a and 211b as a mask. Thus, the thin portion 206 of the diaphragm is formed. The heavily doped layers 210a and 210b are approximately ten times higher in the etching rate than the silicon substrate 203 of low impurity density, so that the silicon substrate 203 can be left as the thin movable portion 206 of the diaphragm at a uniform thickness. Thereafter, as shown in FIG. 3(d), the oxide films 211a and 211b are removed to obtain the silicon diaphragm 203. The external shape of the silicon diaphragm 203 to be fabricated by such process and the shape of the movable portion 206 can be made shapes convenient for design at will.

With the capacitive differential pressure sensor 2 as stated above, the movable portion 206 of the diaphragm 203 is deflected depending upon the difference of the pressures of the fluids or silicon oils 13a and 13b respectively introduced into the pressure chambers 205a and 205b through the pressure introducing apertures 204a and 204b in both the side surfaces of the pressure sensor, the distances between the diaphragm 203 and the respective electrodes 202a and 202b are accordingly varied, and an output voltage $E_o$ expressed by the following equations is provided by an electric circuit not shown:

$$E_o = \frac{C_x}{C_s} \cdot E_s \quad (1)$$

$$C_x = \frac{\epsilon A}{X_o + X} \quad (2)$$

In the above equations, $C_s$ denotes a reference capacitance, $E_s$ the output A.C. voltage of an oscillator in the electric circuit, $\epsilon$ a dielectric constant, A the area of the electrodes, $X_o$ an initial clearance, and X the deflection of the diaphragm.

FIG. 4 shows a capacitive pressure sensor constructed of a diaphragm 203 and a substrate 300a as well as 300b both of which are formed of silicon. Ring-shaped spacers 310a and 310b formed of borosilicate glass are disposed between the silicon diaphragm 203 and the silicon substrates 300a and 300b, to electrically insulate the diaphragm 203 and the substrates 300a and 300b. References 320a and 320b indicate pressure introducing apertures which are respectively formed in the silicon substrates 300a and 300b.

A method of fabricating the above capacitive pressure sensor will now be explained. The spacers 310a and 310b are stacked with the silicon diaphragm 203 intervening therebetween, and the silicon substrates 300a and 300b are placed on both the sides of the resultant structure. A negative electrode is attached to the insulator or the ring-shaped spacers 310a and 310b made of the glass, while a positive electrode is attached to the conductors or the silicon diaphragm 203 and the silicon substrates 300a and 300b. The resultant structure is heated to a temperature of approximately 450° C., and a high voltage of approximately 1,000 volts (V) is applied across the electrodes for several minutes. As a result, the silicon diaphragm 203, the ring-shaped spacers 310a and 310b and the silicon substrates 300a and 300b are firmly joined by the anodic bonding.

Since, in the above embodiment, the substrate 300 is formed of the conductor or silicon, it is unnecessary to evaporate a thin film electrode of a metal or to embed a lead wire in a glass substrate, and a lead wire can be easily taken out by forming a three-layered electrode or an aluminum electrode on the silicon substrate. Therefore, the embodiment can be fabricated more simply.

Figure 7:
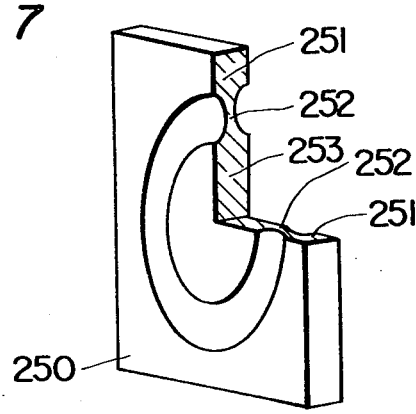
FIG. 7 is a perspective view, partially in section, for elucidating the diaphragms of different shapes shown in FIGS. 5 and 6.

Each of FIGS. 5 and 6 shows another embodiment of the capacitive pressure sensor or differential pressure sensor according to this invention as has a diaphragm 250 the shape of which is different from that of the diaphragm shown in FIG. 1 or FIG. 2. As also shown in FIG. 7, this diaphragm 250 is made up of a thick fixed portion 251 at its peripheral part, an annular and thin movable portion 252, and a thick electrode portion 253 surrounded by the movable portion. With such diaphragm 250, only the thin movable portion 252 is deflected in response to the pressure, and the thick electrode portion 253 is not deflected by the pressure. Therefore, the surfaces of the electrode portion 252 of the diaphragm 250 and the surfaces of the electrodes disposed on the inner surfaces of the two substrates are parallel at all times. It is also recognized experimentally that the linearity of displacements of the diaphragm in such shape by pressures is excellent. Also such diaphragm can be readily fabricated by etching the silicon with the same method as illustrated in FIGS. 3(a) to 3(d). The external shape of the diaphragm 250 shown in FIG. 7 is square and the shape of the thin movable portion 252 thereof is circular, but these shapes can of course be set as desired.

In the embodiment shown in FIG. 5, the diaphragm 250 is firmly joined between the two substrates 201a and 201b formed of borosilicate glass by the anodic bonding technique already stated. The metallic thin film electrodes 202a and 202b are mounted on the inner surfaces of the respective glass substrates 201a and 201b, and the pressure introducing apertures 204a and 204b are formed in the respective substrates.

In the embodiment shown in FIG. 6, the ring-shaped spacers 310a and 310b and further the substrates 300a and 300b formed of silicon are stacked on both the sides of the diaphragm 250, and they are rigidly joined by the anodic bonding technique. Shown at 320a and 320b are the pressure introducing apertures which are respectively formed in the silicon substrates 300a and 300b.

FIGS. 8(a) to 8(e) illustrate a process for manufacturing a silicon diaphragm by utilizing an oxide film as a stopper. First, oxide films 401a and 401b are formed on both the surfaces of a silicon substrate 400 by the C.V.D. process. Polycrystalline silicon layers 402a and 402b are stacked on the respective oxide films 401a and 401b by epitaxial growth, and are baked up at a high temperature of about 1,000° C. Oxide films formed at this time are partly removed, whereupon using the remaining oxide films 403a and 403b as a mask, the stacked polycrystalline silicon layers 402a and 402b are removed by acid etching or the like so as to form a thin movable portion 404. The oxide films left behind are removed. The thickness of the thin movable portion 404 of the diaphragm fabricated by such process is very uniform, and has a good reproducibility.

Figures 8A, 8B, 8C:
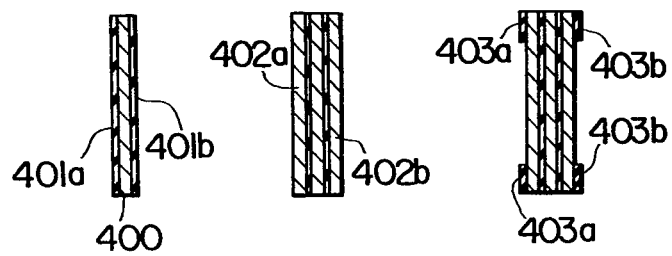
FIGS. 8(a) to 8(e) are views for explaining a manufacturing process for still another diaphragm.
Figures 8D, 8E, 9:
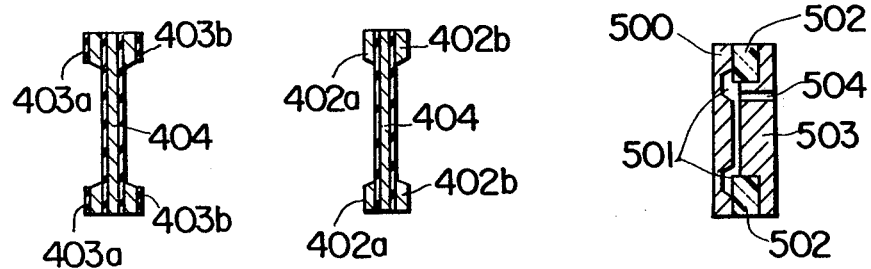
FIG. 9 is a sectional view showing still another embodiment of the capacitive pressure sensor according to this invention.

Thus far, the differential pressure sensors for detecting the difference of two pressures to be measured have been chiefly explained. However, this invention is also applicable to a pressure sensor for detecting one pressure to be measured as shown in FIG. 9. Referring to the figure, only one side is formed with a recess so as to construct a thin movable portion 501. A silicon diaphragm 500 is placed on a substrate 503 formed of silicon through a spacer 502 made of an insulator, for example, borosilicate glass, and they are rigidly secured by the anodic bonding technique already stated. The substrate 503 is formed with a pressure introducing aperture 504, through which an external fluid under the pressure to be measured is introduced into a pressure chamber defined between the substrate 503 and the diaphragm 500. The pressure sensor of such structure is especially suitable as a small-sized and inexpensive pressure sensor such as negative pressure sensor for automobiles.

Although only the borosilicate glass has thus far been mentioned as the material of the insulating substrate or the insulator spacer, it is also possible to use any of quartz, soft glass, sapphire, etc. The following table lists examples of conditions for joining the materials to the silicon diaphragm by the anodic bonding technique:

| Insulating material | Current density ($\mu A/mm^2$) | Time (min.) | Temperature (°C.) |
|---|---|---|---|
| borosilicate glass | 10 | 20 | 400 |
| quartz | 10 | 1 | 900 |
|  | 4 | 4 |  |
| soft glass | 5 | 4 | 450 |
| sapphire | 1 | 1 | 650 |

Regarding the silicon to form the diaphragm or the substrate, either polycrystalline silicon or single-crystal silicon can be employed. In view of experiments, however, the single-crystal silicon is more desirable.

While we have shown and described embodiments in accordance with the present invention, it is understood that the same is not limited thereto but is susceptible to numerous changes and modifications as are obvious to those of ordinary skill in the art, and applicants, therefore, do not wish to be limited to the details described and shown herein but intended to cover all such changes and modifications as are obvious to those of skill in the art.

What is claimed is:

1. A capacitive pressure sensor comprising:
 a conductive silicon diaphragm having at least at one side thereof a thick peripheral supporting portion and a thin deflecting portion which may be deflected depending on the pressure applied thereto, said thin deflecting portion being surrounded by said thick peripheral supporting portion so as to form a hollow at said one side of said diaphragm;

a substrate of borosilicate glass having an aperture formed therein and at least a flat side face disposed against said one side of said conductive silicon diaphragm so that said hollow of said diaphragm and said flat side face of said substrate form a pressure chamber into which a fluid under pressure to be detected may be supplied through the aperture; and at least a conductive thin layer provided on a portion of said flat side face of said substrate in said pressure chamber so as to be opposed to said diaphragm thereby forming electrostatic capacity between said conductive thin layer and said conductive silicon diaphragm;

said conductive silicon diaphragm and said substrate being rigidly joined by a process of anodic bonding to seal said pressure chamber, said joining including said thick supporting portion of said diaphragm and a portion of said substrate.

2. The capacitive pressure sensor as defined in claim 1, wherein said thin deflecting portion of said silicon diaphragm is reduced symmetrically from both sides of said thick peripheral supporting portion to form hollows on both sides of said diaphragm.

3. The capacitive pressure sensor as defined in claim 2, further including a second substrate of borosilicate glass with a flat side face; a thin film electrode provided on the flat side face of said second substrate, said second substrate being disposed against the other side of said silicon diaphragm in contact with said thin peripheral supporting portion of said silicon diaphragm so that a pair of pressure chambers are formed at respective sides of said silicon diaphragm; and joining means joining said second substrate to said silicon diaphragm by anodic bonding.

4. A capacitive pressure sensor comprising:

a conductive silicon diaphragm having a thick peripheral supporting portion, a thin deflecting portion surrounded by said supporting portion, and a rigid movable portion surrounded by said thin deflecting portion;

a substrate of borosilicate glass having an aperture formed therein and being disposed on said thick peripheral supporting portion of said diaphragm so as to form a pressure chamber; and a thin film electrode disposed on one side of said substrate in said pressure chamber thereby to provide electrostatic capacity between said thin film electrode and said rigid movable portion of said diaphragm;

said conductive silicon diaphragm being joined to said substrate by a process of anodic bonding.

5. The capacitive pressure sensor as defined in claim 4, wherein said rigid movable portion is flat.

6. The capacitive pressure sensor as defined in claims 4 or 5, wherein said thin deflecting portion is annular.

7. A capacitive pressure sensor comprising:

a conductive silicon diaphragm having a thick supporting portion and a thin deflecting portion which may be deflected depending on the pressure applied thereto;

a spacer of borosilicate glass having a pair of parallel plane surfaces; and a substrate of conductive silicon having an aperture formed therein and being disposed on said thick supporting portion of said diaphragm with said spacer interposed therebetween, thereby forming a pressure chamber between said diaphragm and said substrate into which a fluid may be supplied through said aperture of said substrate, the spacing between said substrate and said diaphragm forming electrostatic capacity therebetween;

said conductive silicon diaphragm, said spacer, and said substrate being joined by a process of anodic bonding.

8. The capacitive pressure sensor as defined in claim 7, wherein said conductive silicon diaphragm has a thick movable portion in the central portion thereof, and said thin deflecting portion of said conductive silicon diaphragm is formed between said thick supporting portion and said thick movable portion so that said conductive silicon diaphragm will be deformed only at said thin deflecting portion.

9. The capacitive pressure sensor as defined in claim 8, wherein said thin deflecting portion of said conductive silicon diaphragm is reduced symmetrically in thickness from said thick supporting portion to said thin electrode portion.

10. The capacitive pressure sensor as defined in claim 9, wherein at both sides of said conductive silicon diaphragm, a pair of said pressure chambers are provided each of which is defined by said conductive silicon diaphragm and said substrate for forming electrostatic capacity.

11. The capacitive pressure sensor as defined in claims 1, 4 or 7, wherein said thin deflecting portion of said diaphragm is formed by an etching process.

* * * * *